United States Patent [19]

Luckey et al.

[11] 4,311,487

[45] Jan. 19, 1982

[54] RECRYSTALLIZATION OF ACTIVATED RARE-EARTH OXYHALIDE PHOSPHORS

[75] Inventors: George W. Luckey; Christine M. Towers, both of Rochester, N.Y.

[73] Assignee: Eastman Kodak Company, Rochester, N.Y.

[21] Appl. No.: 158,192

[22] Filed: Jun. 11, 1980

[51] Int. Cl.$^3$ .............................................. C09K 11/46
[52] U.S. Cl. ...................... 23/305 RE; 252/301.4 H
[58] Field of Search ............ 252/301.4 H; 23/305 RE

[56] References Cited

U.S. PATENT DOCUMENTS

| | | |
|---|---|---|
| 2,729,605 | 1/1956 | Swindells . |
| 3,591,516 | 7/1971 | Rabatin . |
| 3,607,770 | 9/1971 | Rabatin ........................ 252/301.4 H |
| 3,667,921 | 6/1972 | Grodkiewicz et al. ... 252/301.4 H X |
| 4,068,129 | 1/1978 | Rabatin ..................... 252/301.4 H X |
| 4,080,306 | 3/1978 | Ferretti ........................ 252/301.4 H |

OTHER PUBLICATIONS

Matsubara, "Mat. Res. Bull.", vol. 7, pp. 963-969, 1972.
Mazza et al., "Gazzetta-Chimica Italiana", 70, pp. 57-72, 1940.

*Primary Examiner*—Jack Cooper
*Attorney, Agent, or Firm*—J. Jeffrey Hawley

[57] ABSTRACT

A method for the recrystallization of activated rare-earth oxyhalide phosphors is disclosed. The method comprises recrystallizing the phosphor by firing a phosphor-flux mixture in an inert atmosphere. The phosphor-flux is substantially homogeneous and the flux contains substantially dehydrated magnesium halide. One particularly preferred phosphor made by the method is a lanthanum oxychloride phosphor coactivated with bismuth and ytterbium. This phosphor made by the present method has high speed and low afterglow.

14 Claims, No Drawings

RECRYSTALLIZATION OF ACTIVATED RARE-EARTH OXYHALIDE PHOSPHORS

FIELD OF THE INVENTION

This invention relates to a method for recrystallizing rare-earth oxyhalide phosphors. The process described herein produces phosphors with well-formed crystals which have high speed and low afterglow.

DESCRIPTION RELATIVE TO THE PRIOR ART

The use of phosphorescent compositions in radiographic intensifying screens and in other applications is well-known. The use of these compositions in radiographic intensifying screens reduces the exposure of X-rays required to produce a usable image on radiographic film. The intensifying screen absorbs the X-rays and converts the X-rays, through fluorescence, into useful energy, i.e., energy to which the radiographic film is more sensitive. The "speed" of a given phosphorescent composition is related to the efficiency of this absorption and conversion. The greater the amount of useful energy which is given off when the composition is excited by a given amount of X-rays, the greater the speed of the composition. There is a continuing need for radiographic intensifying screens which allow for reductions in the amount of X-ray exposure needed to produce a useful image on radiographic film.

One particular phosphorescent composition or phosphor which has been suggested is a bismuth-activated rare-earth oxyhalide phosphor. More particularly, Swindells in U.S. Pat. No. 2,729,604 teaches that a bismuth-activated rare-earth oxychloride shows strong emission in the blue and near ultraviolet regions of the spectrum when excited with cathode rays. The phosphor was made by mixing lanthanum oxide and bismuth trioxide in hydrochloric acid. The solution was evaporated to dryness, baked and then calcined to produce the oxychloride phosphor. To our knowledge, this phosphor has not been used commercially in an X-ray intensifying screen. The possible reason for this is that the phosphor made by the method taught by Swindells, as well as by other prior-art methods, is relatively slow when excited by X-rays. Further, when the bismuth-activated lanthanum oxychloride phosphors are made by these prior-art methods, afterglow is often unacceptably high. "Afterglow" is the tendency of the phosphor to continue to fluoresce after the exciting radiation has been removed. Afterglow of the phosphor in an X-ray intensifying screen can result in an undesirable ghost image of an earlier exposure when the screen is subsequently used.

Several methods are known for producing well-formed oxyhalide phosphor crystals. One method is described in U.S. Pat. No. 3,591,516 by Rabatin. Rabatin teaches a two-step process. In the first step, a rare-earth oxyhalide is prepared by heating the rare-earth oxide with the corresponding ammonium halide to produce a fine-grain rare-earth oxyhalide. In the second step, the rare-earth oxyhalide is heated with an alkali halide for at least about one hour at a temperature above the melting point of the alkali halide. This second step recrystallizes the oxyhalide made from the first step, producing crystals of improved size. Unfortunately, when this method is attempted with the bismuth-activated rare-earth oxyhalide phosphors, the afterglow of the resulting phosphor is often relatively high.

Many methods are known for producing rare-earth oxyhalides; however, not all of these methods have been adapted to produce activated rare-earth oxyhalide phosphors. For example, several methods which have not been adapted are disclosed by Mazza et al, *Gazzetta Chimica Italiana*, 70, 57-72 (1940). One method disclosed by Mazza et al is to heat anhydrous magnesium chloride above its melting point and then add lanthanum oxide to the heated flux. Aside from the fact that no activated phosphors were prepared by Mazza et al, the method described is somewhat impractical because it requires addition of material to a flux inside a furnace. This process is further complicated by the fact that the reaction must be carried out in an inert atmosphere to prevent the formation of magnesium oxychloride. Adding material inside a furnace in an inert atmosphere requires complicated and expensive equipment. The process of Mazza et al is adaptable to produce an activated phosphor. However, this method produces, at least initially, a non-homogeneous oxide-flux mixture which, we have found, produces relatively low-speed phosphors with large grain size and poor grain-size distribution.

To summarize, there has been a continuing need for a simple process which is capable of producing activated rare-earth oxyhalide phosphors which are useful in X-ray intensifying screens. The process should produce phosphors with a crystal size which is not so small as to be low in speed and not so large as to be difficult to coat. It would be highly desirable if the phosphor produced by the new process had a combination of high speed and low afterglow.

SUMMARY OF THE INVENTION

Well-formed crystals of activated rare-earth oxyhalide phosphors are made by recrystallizing the phosphor crystals in a substantially dehydrated magnesium halide flux. More particularly, a substantially homogeneous mixture of the activated rare-earth oxyhalide and a flux is prepared. This mixture is fired in an inert atmosphere at a temperature above the melting point of the flux. This process produces improved crystals having excellent speed and low afterglow. The crystals have excellent grain size and grain-size distribution.

According to the present invention, a homogeneous mixture of oxyhalide and flux is prepared. This mixture is unlike that of Mazza et al where the mixture is not homogeneous and where the starting material is the oxide rather than the oxyhalide. The process of the present invention produces a phosphor which is unexpectedly superior to an activated phosphor made by a process similar to that of Mazza et al. This is shown in comparative Example 15.

While the process of the present invention described above provides significantly improved activated rare-earth oxyhalide phosphors, yet other specific process conditions provide still further improvements. Thus, addition of an alkali metal halide to the flux results in further improvements in speed and grain-size distribution, particularly if the flux contains some magnesium oxide. Similarly, still further improvements in grain size and grain-size distribution are achieved when the firing is carried out in a confined chamber and the mixture is compressed to a density greater than 0.8 g/cm$^3$ prior to firing. Still further improvements are realized when the substantially dehydrated magnesium halide contains less than about 2 moles and preferably less than about 1.5 moles of water per mole of magnesium halide.

While a wide variety of methods is useful to produce the starting activated rare-earth oxyhalide, one method is particularly preferred. In this method, the activated rare-earth oxyhalide to be recrystallized is prepared by reaction of an activator-rare-earth mixed oxide or oxide mixture with gaseous halogen, preferably at temperatures above 400° C. This process produces an activated rare-earth oxyhalide in the form of a fluffy white powder which is easily mixed with the flux components.

One particularly preferred recrystallized activated rare-earth oxyhalide which is prepared by the process of the present invention is bismuth-activated lanthanum oxychloride. The process of the present invention produces this phosphor in a form which has high speed and relatively low afterglow when exposed to X-radiation. The afterglow of this phosphor is still further reduced by incorporating ytterbium into the oxychloride crystal before recrystallization.

The end result of the process of the present invention is an activated rare-earth oxyhalide which has a grain size and grain-size distribution which are particularly suited to coating with conventional binders for X-ray screens. The excellent grain size of the phosphors made according to the present invention reduces the surface area/unit volume of the crystals in comparision with smaller crystals and thereby decreases the adverse effects of humidity on these phosphors. Further, the phosphors made by the process of the present invention show excellent speed and low afterglow. For example, the lanthanum oxychloride phosphors which are coactivated with bismuth and ytterbium have speeds which are as much as 3.7 to 4 times that of a commercially available lead-activated barium sulfate phosphor. At the same time, the afterglow of these phosphors under severe conditions is about equal that of a commercially available lead-activated barium sulfate phosphor.

DETAILED DESCRIPTION OF THE INVENTION

The present invention relates to the preparation of activated rare-earth oxyhalide phosphors. Phosphors such as terbium-activated lanthanum oxybromide, terbium-activated gadolinium oxychloride, samarium-activated lanthanum oxychloride, antimony-activated lanthanum oxychloride, thulium-activated lanthanum oxybromide and bismuth- and ytterbium-activated lanthanum oxybromide are examples of phosphors made by the process of the present invention. In the detailed description which follows, preparation of the particularly preferred bismuth-activated lanthanum oxychloride will be discussed in detail. However, it will be understood that, by the appropriate selection of starting activated rare-earth oxyhalide and the corresponding flux halide, other recrystallized phosphors are contemplated.

The description which follows also makes particular reference to the use of phosphors made by the process of the present invention in X-ray intensifying screens. It will be readily appreciated, however, that these phosphors have other uses such as in cathode-ray tubes, lamps and the like.

It is well-known in the art relating to phosphors that any impurities contained in the phosphor crystal present a danger of seriously affecting the spectral emission and/or the afterglow. Therefore, the starting materials for the process of the present invention are preferably free from these impurities. Similarly, containers in which these materials are stored and processed should be selected from materials free from these harmful impurities.

Where the phosphors made by the process of the present invention are to be used in X-ray screens, the starting materials are preferably particularly free from radioactive impurities. These radioactive impurities emit radiation which excites the phosphor. This in turn produces fogging of radiographic film stored in contact with the screen. Radioactive impurities are removed from rare earths by various methods such as ion exchange and fractional precipitation. One fractional precipitation method is described in *Research Disclosure*, Vol 183, item 18365, July, 1979. *Research Disclosure* is a publication of Industrial Opportunities Ltd, Homewell, Havant, Hampshire PO9 IEF, UK.

According to a preferred embodiment of the process of the present invention, a bismuth-activated rare-earth oxyhalide is recrystallized in a flux comprising a substantially dehydrated magnesium chloride. In its commercial form, magnesium chloride is available as the hexahydrate. For the process of the present invention, the magnesium chloride is substantially dehydrated. By "substantially dehydrated" we mean that more than just the easily removable water of crystallization has been removed. For example, simply heating magnesium chloride hexahydrate to 100° C. will drive off some of the water of crystallization, but not enough for the purpose of the present invention. Additional water must be removed, such as by heating the magnesium chloride to 200°–300° C. in a vacuum or in an inert atmosphere, to dehydrate substantially the magnesium chloride. This preparation is illustrated in Preparation 1 preceding the Examples. It is preferred that the content of water in the magnesium chloride be between about 0 and 3 moles of water per mole of magnesium chloride. Best results are obtained when the water content is less than about 2 moles, and preferably less than about 1.5 moles, of water per mole of magnesium chloride. Best results are also achieved when the substantially dehydrated magnesium chloride is ground to such an extent that it will pass through a sieve having 500-micrometer openings or smaller so that the flux mixes well with the phosphor to be recrystallized.

One preferred method of preparing substantially dehydrated magnesium halide is first to react the hydrated magnesium halide with the corresponding ammonium halide and then to heat the resulting ammonium magnesium halide hydrate in an inert atmosphere. This preparation is illustrated in Preparation 2 preceding the Examples. This preparation produces a magnesium halide having an extremely low water content and an extremely low content of magnesium oxide.

The bismuth-activated lanthanum oxychloride is mixed with the dehydrated magnesium chloride and placed in a suitable container for firing. Prior to firing, the bismuth-activated rare-earth oxychloride and the flux should be in the form of a substantially homogeneous mixture. This substantially homogeneous mixture is obtained by grinding the oxychloride and flux together, by passing the two components through a static mixer, or by any other suitable method. The described substantially homogeneous mixture is distinguished from the mixture which results from the process of Mazza et al discussed above where rare-earth oxide is poured into the molten flux. We have found that producing a substantially homogeneous mixture of the oxychloride-flux prior to firing produces markedly improved crystals of rare-earth oxyhalide, i.e., crystals having improved grain size and grain-size distribution, with higher speeds when excited by X-rays.

Recrystallization is carried out in an inert atmosphere at a temperature above the melting point of the flux. Any inert gas is useful to provide the inert atmosphere. Suitable inert gases include nitrogen, argon and xenon. A particularly suitable atmosphere is a nitrogen atmosphere. Firing is carried out by simply heating the container containing the bismuth-activated rare-earth oxychloride-flux mixture in a suitable furnace such as a tube furnace or a muffle furnace. As noted, the temperature of firing should be above the melting point of the flux. Where substantially dehydrated magnesium chloride is used alone as the flux, heating above about 700°–750° C. is sufficient to recrystallize the rare-earth chloride. The time of firing is not critical and varies over a wide range, but is generally between about 15 min. and 2 h. Using the present specification as a guide, the optimum temperature and time for a given flux-oxyhalide mixture is easily determined.

In a particularly preferred embodiment of the present invention, the flux comprises, in addition to the substantially dehydrated magnesium halide, an alkali metal halide. It has been found that in some cases the use of the substantially dehydrated magnesium halide flux increases the size of the recrystallized crystals to such an extent that they become difficult to coat. By using a flux containing the dehydrated magnesium halide, along with an alkali metal halide, the size of the crystals is controllable. The use of the alkali metal halide is particularly desirable where the flux contains a significant amount of magnesium oxide. Thus, well-formed crystals which are of such a size to produce good speed are formed, while at the same time large uncoatable crystals are avoided. Any suitable alkali metal chloride is useful. For example, chlorides of lithium, potassium and sodium provide good results. Lithium chloride is particularly preferred.

The process of the present invention produces crystals which are fairly large, i.e., greater than 1 micron, but are not so large, i.e., greater than 30 microns, that they cannot be easily coated. Preferably, a substantial portion of the phosphor crystals made according to the process of the present invention is between 8–12 microns.

The addition of the alkali metal chloride to the flux decreases, to a certain extent, the melting point of the flux. However, where the alkali metal chloride is present, the recrystallization is carried out at temperatures about the same as that when substantially dehydrated magnesium chloride alone is used. Temperatures in the range of about 800° to about 900° C. are useful in this embodiment. It has been found that particularly desirable results with lithium chloride are obtained at about 800° C., while the potassium or other alkali metal chlorides produce particularly preferred results at about 900° C. While any temperature above the melting point of the flux is useful with alkali metal chlorides, the particular temperatures mentioned for the particular alkali metal chlorides above increase the speed of the phosphors without increasing the afterglow and produce acceptable grain size distributions.

In particularly preferred embodiments, the firing of the bismuth-activated rare-earth oxyhalide-flux mixture is carried out in a packed and confined chamber. This is particularly important for small batches using small chambers. By "confined chamber" is meant that the chamber which contains the oxyhalide-flux mixture is covered. One suitable confined chamber is simply a crucible, at least about 30 percent full of the mixture, which is covered by a lid. The compression or packing of the mixture and confined chamber improves grain size and size distribution. Packing densities of at least about 0.8 g/cm$^3$ are preferred. However, densities much above about 1.7 or 1.8 g/cm$^3$ provide no further improvement in grain size or size distribution.

A wide variety of known methods is useful in forming the initial activated rare-earth oxychloride which is to be recrystallized. For example, one method is to form the oxyhalide to be recrystallized in situ. In this method, activator-rare-earth mixed oxide or oxide mixture is blended with the substantially dehydrated magnesium halide flux. This mixture is then packed in a crucible. The crucible is covered and placed in a furnace. Heating to a temperature of above about 700° C. forms the activated rare-earth halide phosphor in situ and, at the same time, crystallizes this oxyhalide from the dehydrated magnesium halide flux.

The particularly preferred method for forming an activated rare-earth oxyhalide starting material is by reaction of the mixed oxide or oxide mixture with gaseous halogen. This process produces a very active, fluffy, white starting material which is easily mixed with the flux. For example, an extremely fine-grained, bismuth-activated lanthanum oxychloride is prepared by heating the bismuth-lanthanum mixed oxide or oxide mixture which chlorine at about 480° C.

The activator-rare-earth mixed oxide or oxide mixture is a starting material for either the in situ formation of the oxyhalide or the preferred gaseous halogen preparation of the oxyhalide. The oxide mixture is prepared by a simple blending of the activator oxide with the rare-earth oxide. The mixed oxide is formed by methods known in the art, such as by coprecipitating the rare earth and the activator from an aqueous solution such as with oxalic acid. The oxalate precipitate is then dried and the mixed oxide is formed by firing the dry oxalate at 800° C. for 1 h in air.

The molar ratio of the activated rare-earth oxyhalide to be recrystallized and the flux components in the mixture varies over a wide range. A useful range for the ratio of activated rare-earth oxyhalide:dehydrated magnesium halide is 1.00:0.20–1.00. Where the flux contains an alkali metal halide, the molar ratio of activated rare-earth oxyhalide:substantially dehydrated magnesium chloride:alkali metal halide is 1.00:0.20–1.00:0.20–0.75. The preferred molar ratio will depend upon the exact size of the oxyhalide crystals desired, the exact composition of the flux and other factors. A particularly preferred molar ratio of the above components is 1.00:0.35:0.35 when the substantially dehydrated magnesium chloride is used with lithium chloride to recrystallize the bismuth-activated lanthanum oxychloride at 800° C.

The phosphor made by the process of the present invention is particularly useful in X-ray conversion screens. The preferred phosphor is a bismuth-activated lanthanum oxychloride phosphor with a small amount of the coactivator ytterbium to control residual afterglow. Both the bismuth and the ytterbium content are variable over a wide range. Preferably the bismuth content is between about 0.3 and 3.0 molar percent based on the lanthanum present. The ytterbium content is generally lower than the bismuth content and is desirably between about 0.005 and 0.5 molar percent based on the lanthanum present. (Activated phosphors are generally represented by a formula having the activator and its molar concentration after a colon. For example, LaOCl:Bi(0.01) represents a bismuth-activated lanthanum oxychloride wherein the bismuth content is 1 molar percent based on the amount of lanthanum.) The molar percentages listed are the molar percentages in the starting oxide materials. Firing and recrystallization slightly decrease the activator molar percentages in the final phosphor.

The recrystallization step of the present invention produces an oxyhalide phosphor which is mixed with a flux. After the recrystallization, the phosphor is separated from the flux by breaking the oxyhalide-flux mixture into fragments and washing with an acidic solution to dissolve the flux and disperse the phosphor. One particularly useful acidic solution is a 1:3 acetic acid:water solution. While the time of this washing varies depending upon the amount of flux, the flux composition, the size of the oxyhalide phosphor crystals produced and other factors, it usually requires about 1–2 hr of washing in the acid solution to remove substantially all of the flux.

A preferred use of the phosphors prepared according to the process of the present invention, particularly the bismuth- and ytterbium-activated lanthanum oxychloride, is in radiographic intensifying screens. These intensifying screens consist essentially of the phosphors described herein which are dispersed or suspended in a suitable binder and coated on a support. Useful binders include sodium o-sulfobenzaldehyde acetal of polyvinyl(alcohol), chlorosulfonated polyethylene, a mixture of macromolecular bisphenol polycarbonates and copolymers comprising bisphenol carbonates and poly-(alkylene oxides), aqueous ethyl alcohol-soluble nylon, poly(ethylacrylate-co-acrylic acid), or a combination of alkylmethacrylate polymer and a polyurethane elastomer. These and other useful binders are disclosed in U.S. Pat. Nos. 2,502,529, 2,887,379, 3,617,285, 3,300,310, 3,300,311 and 3,743,833 and in *Research Disclosure*, 154, Item 15444, February, 1977, and 182, Item 18269, June, 1979. A particularly preferred binder is a linear aliphatic polyurethane binder. These binders are available from Cargill, Inc, P O Box 9300, Minneapolis, Minnesota 55440, under the trade name Cargill TM and from the Permuthane Division of Beatric Foods Co, Peabody, Massachusetts, under the trade name Permuthane TM. These linear aliphatic polyurethanes are particularly preferred because they have low optical density in that portion of the spectrum in which the bismuth-activated lanthanum oxyhalide phosphors described herein emit. Particularly preferred binders include Permuthane TM U6366 and U6700.

X-ray intensifying screens comprising the phosphors made by the process of the present invention are formed by coating the phosphor-binder composition on a suitable support. Useful phosphor-to-binder ratios, coverages and supports are disclosed in the above-identified references which relate to the useful binders.

X-ray internsifying screens comprising the described phosphors are optionally overcoated with a protective coating to provide desirable resistance to the effects of humidity and scratches. Particularly useful layers are of cellulose acetate. This overcoat layer for the screen optionally contains addenda such as matting agents.

X-ray intensifying screens comprising the bismuth-activated phosphors described herein emit radiation in the ultraviolet portion of the spectrum when excited by radiation in the X-ray portion of the spectrum. These screens are therefore used with advantage with UV- and blue-sensitive elements. Particularly useful elements have coated thereon silver halide layers, particularly layers of silver bromide or silver chloride. The silver halide optionally comprises varying amounts of other halides such as silver iodide, silver bromide, silver chlorobromide and silver bromoiodide. Useful silver halide UV- and blue-sensitive layers include gelatino silver bromoiodide emulsions in which the average grain size of the silver bromoiodide crystals is in the range of about 0.5 to about 5 microns. When a double-coated silver halide element is employed (a support coated on both sides with silver halide), the total silver coverage per unit area for both coatings will usually be less than about 0.080 g. Preferably, each coating will contain less than about 0.040 g of silver/dm$^2$. These layers are applied by means well-known in the art. Silver halides used in radiographic recording layers are desirably coarse-grained silver halide emulsions; however, fine-grained emulsions are also useful either alone or in a blend with coarse-grained emulsions to provide extended exposure latitude or improved covering power. The emulsions employed in radiographic materials are either surface-sensitive emulsions or emulsions which form latent images primarily in the interior of the silver halide grains. In some cases, blends of surface-sensitive emulsions and internal latent image-forming emulsions are useful to obtain image intensification. Illustrative examples of useful emulsions are those emulsions described in U.S. Pat. Nos. 3,979,213, 3,772,031, 3,761,276, 3,767,413, 3,705,858, 3,695,881, 3,397,987, 2,996,382, 3,178,282 and 3,316,096. A general disclosure relating to silver halide elements is found in *Research Disclosure*, Vol 176, item 17693, December, 1978.

The useful silver halide is unsensitized or sensitized. Useful sensitizers include active gelatin and chemical compounds such as sulfur, selenium and tellurium. Combinations of these sensitizers are also useful. In addition to the sensitizers, the emulsion optionally contains other addenda such as stabilizers, antifoggants, brighteners, antikinking agents and hardeners.

The UV-sensitive silver halide emulsions which are useful with the phosphors prepared by the process of the present invention are coated on a wide variety of supports. Useful supports include poly(ethylene terephthalate), cellulose nitrate, cellulose ester, poly(vinyl acetal), poly(styrene) and cards or paper which are coated with α-olefin polymers. If desired, the support comprises a light-absorbing material either within the support itself or on a layer over and/or under the support, or both.

In order to minimize the X-ray dosage received by a patient, it is sometimes desirable to coat silver halide emulsion layers on both sides of a film support. This recording element is then exposed between two intensifying screens which contain the phosphors prepared by the process of the present invention. The use of two intensifying screens contiguous the silver halide emulsion layers causes a phenomenon referred to in the art as crossover exposure. Crossover exposure is reduced by a variety of methods. For example, a light-polarizing layer is coated between the silver halide emulsion layer and the support, as is taught in *Research Disclosure*, 146, item 14661, June, 1976; coating a removable absorbing dye, compound or filter dye layer which absorbs light of the same wavelength region emitted by the intensifying screen; adding a screening dye to the X-ray fluorescent intensifying screen; and incorporating a screeningdye in the X-ray fluorescent screen and a filtering dye in the silver halide emulsion layer between the silver halide emulsion layer and the support on both sides; adding an absorbing compound to the film support, as described above. These and other methods of controlling crossover exposure are described in *Research Disclosure*, 122, item 12233, June, 1974; U.K. Pat. Nos. 1,426,277 and 1,459,789; and U.S. Pat. No. 3,822,131 and 3,923,515.

Silver halide elements and methods for preparing and processing these elements, which are particularly suited to radiography, are described in *Research Disclosure*, Vol 184, item 18431, August, 1979.

In the examples which follow, the speed of any given phosphor preparation is measured by exposing a silver halide emulsion-coated film in the following manner. After the phosphor is prepared, it is placed in cups at a coverage of about 0.3–0.5 g/cm² and exposed to unfiltered 70 kV$_p$ X-rays. The emitted light from the phosphor is recorded with an X-ray film having a nonspectrally sensitized, coarse-grained gelatin silver bromoiodide (2 mole percent iodide) emulsion coated on one side of a poly(ethylene terephthalate) support. The film is placed in contact with the cup containing the phosphor. The exposed film is then processed in the usual manner. The speeds of the present phosphors are reported relative to the speed which is obtained in this experiment, using a screen containing terbium-activated lanthanum oxybromide phosphor. The difference in speed is calculated, through the density v log E (log exposure) curve for the film, from the densities which result in the developed film in this experiment.

In the examples which follow, the data for afterglow are determined by exposing a sample of the phosphor to be tested to unfiltered 70 kV$_p$ X-rays for 10 seconds. This represents an exposure which is about 100 times the normal exposure. The sample of phosphor to be tested is then placed in contact with a silver halide element similar to the one described above in relation to the measurement of speed, except that the element for measuring afterglow is coated on both sides with silver halide emulsion (double-coated film). The phosphor is allowed to remain in contact with the film for about 24 hours. After this exposure, the film is exposed uniformly with light sufficient to produce a density of about 0.5 in the normal film process. The film is then processed in the normal manner. The data for afterglow which are reported in the following examples are the total developed densities for the area which received both the phosphor exposure and the overall light exposure minus the 0.5 which results from the light exposure alone.

Preparation 1:

Dehydration of magnesium chloride

Commercially available hydrated magnesium chloride was heated at about 100° C. to remove a substantial fraction of the water. This partially dehydrated magnesium chloride was heated in a vacuum to about 270° C. for about 8 hours to reduce the level of water to about 1–2 moles of water/mole of magnesium chloride. This substantially dehydrated material was then ground and passed through a sieve with 250-micrometer or 500-micrometer openings.

Preparation 2:

Dehydration of magnesium chloride using ammonium magnesium chloride hydrate intermediate About 1 g mole of MgCl$_2$.6H$_2$O was mixed with 1 g mole of ammonium chloride in enough distilled water for a total volume of 0.4 liter. The solution was filtered at 90° C. through a 0.45$\mu$ pore filter, then boiled to decrease volume to 0.3–0.35 liter. (Solids begin to appear at 0.35 liter.) The flask with contents was cooled to room temperature, then to −5° C. in a dry ice bath, stirring occasionally. The solid material was collected by suction filtration on glass-fiber filter paper, rinsing several times with 0.2 liter ethyl alcohol per rinse. After transferring the compound to a large, open crystallizing dish, drying was continued in a vacuum oven at 170° C. for 4 hr, stirring several times. The material was then broken up with a mortar and pestle in a nitrogen-atmosphere dry box, sieved to 500$\mu$ and bottled.

About 125–150 g of the ammonium magnesium chloride hydrate made as described in the previous paragraph was placed in a quartz boat in a quartz tube furnace. Using a 0.14 m³/hr dry nitrogen gas flow throughout the run, the sample was purged for 15 min while the boat was in the cool zone of the furnace. It was then pushed into the furnace which was at a temperature of 200° C. After heating for 1 hr, the boat was withdrawn, cooled, and the sample removed and lightly ground with a mortar and pestle. It was then replaced in the furnace, purged again with the nitrogen for 15 min in the cool zone, then moved into the furnace which was by then at a temperature of 430°–435° C. The sample loses about 66% of its weight during this process and analysis shows that the content of water in the resulting substantially dehydrated magensium chloride is less than 4% by weight.

The following examples are presented to illustrate the invention.

EXAMPLE 1

Preparation of Bismuth-Activated Lanthanum oxychloride LaOCl:Bi(0.01), Yb(0.002)

A. Preparation of the mixed oxide

A solution, A, was prepared by mixing 935 mL of 2 molar lanthanum chloride, 4.65 g of bismuth oxide which had been dissolved in 75 mL of 37.5 percent hydrochloric acid, 9.35 mL of 0.4 molar ytterbium chloride and sufficient distilled water to make 5 liters of solution.

A second solution, B, was prepared by dissolving 3 moles of oxalic acid dihydrate in sufficient distilled water to make 5 liters of solution.

A third solution, C, was made by dissolving 0.75 mole of oxalic acid dihydrate and 75 mL of 37.5 percent hydrochloride acid in sufficient distilled water to make 5 liters. All of the solutions were filtered through 0.47-micron micropore filters prior to use.

Solution C was heated to 40° C. and then placed in a 22-liter reaction vessel having fluted sides. Solutions A and B were heated to 40° C. and simultaneously added to Solution C with vigorous agitation (i.e., a 5-cm glass stirrer, rotating at 2000 rpm) at a rate of 250 mL of each solution per min. When the addition was complete, the resulting precipitate was washed 3 times by decantation with water, collected and dried in air. This precipitate was then fired for 1 h at 800° C. in air to form the mixed oxide or lanthanum, bismuth and ytterbium.

B. Preparation of bismuth-activated lanthanum oxychloride phosphor

The mixed oxide described above was placed in a quartz boat and heated to 480° C. in an atmosphere of chlorine in a tube furnace. The flow rate of chlorine was 2.056 m³/h measured with a flow meter calibrated with air. After about 2 h under these conditions, the mixed oxide was converted to a fluffy, fine-grained lanthanum oxychloride phosphor coactivated with bismuth and ytterbium.

C. Recrystallization of the bismuth-activated lanthanum oxychloride phosphor

About 24.8 g of the bismuth- and ytterbium-activated lanthanum oxychloride phosphor described above were mixed with 11.2 g of magnesium chloride 1.45 $H_2O$ present invention. While acceptable speed is obtained by recrystallization in an alkali metal halide alone (comparisons C and D) without the $MgCl_2$ flux, the resulting phosphor has high afterglow, even though the phosphor contained ytterbium. In Example 7, a bismuth-activated lanthanum oxychloride made according to the invention not having ytterbium to affect afterglow has high afterglow but has exceptional speed.

TABLE 1

| Example | Phosphor | Flux | Flux Ratio | Afterglow | Speed (Log E Difference) |
|---|---|---|---|---|---|
| Comparison A | $BaSO_4$:Pb | — | — | .03 | +.20 |
| Comparison B | LaOBr:Tb screen | — | — | 1.2 | reference |
| 4 | LaOCl:Bi(.01), Yb(.002) | $MgCl_2$ . 1.45$H_2O$ | 24.8:14.9 | .06 | +.35 |
| 5 | LaOCl:Bi(.01), Yb(.002) | $MgCl_2$ . 1.45$H_2O$ + KCl | 24.8:14.9:5.8 | .04 | +.62 |
| 6 | LaOCl:Bi(.01), Yb(.002) | $MgCl_2$ . 1.45$H_2O$ + NaCl | 24.8:14.9:4.5 | .03 | +.63 |
| 7 | LaOCl:Bi(.01) | $MgCl_2$ . 1.45$H_2O$ + KCl | 24.8:14.9:5.8 | 1.7 | +.74 |
| Comparison C | LaOCl:Bi(.01), Yb(.0012) | KCl | 24.8:14.5 | 1.6 | +.53 |
| Comparison D | LaOCl:Bi(.01), Yb(.0012) | NaCl | 24.8:11.4 | 1.4 | +.58 | made as described in Preparation 1 and 1.7 g of lithium chloride. The mixture was pressed tightly into an alumina crucible, covered with an alumina lid, and heated in a nitrogen atmosphere for 1¼ h at 800° C. The resulting mixture was cooled in a nitrogen atmosphere, removed from the crucible and broken into fragments. These fragments were then stirred for about 1 h with a 1:3 acetic acid:water solution to disperse the recrystallized phosphor. The recrystallized phosphor was then collected, rinsed with ethanol and dried at 55° C. in vacuum for 1 h.

The recovered bismuth- and ytterbium-activated lanthanum oxychloride phosphor described above was compared for speed and afterglow with a commercial LaOBr:Tb. The described lanthanum oxychloride phosphor was 0.45 log E faster than the commercial screen and had a minimal afterglow of 0.0 as compared with 0.9 for the commercial screen.

EXAMPLE 2

Example 1 was repeated except that flux used in the recrystallization step consisted of 14.9 g of the dehydrated magnesium chloride and no lithium chloride. The afterglow comparison with the commercial screen were substantially the same, but the speed of the phosphor was about 6% less. Several large phosphor crystals were observed.

EXAMPLE 3

Example 2 was repeated except that the ytterbium was omitted from the bismuth-activated lanthanum oxychloride precursor. In this case, the speed was about 0.51 log E greater than that of the commercial LaOBr:Tb screen and the afterglow was 2.90.

This experiment shows that the ytterbium ion substantially reduces the afterglow of these phosphors without a large decrease in speed.

EXAMPLES 4-7

Example 1 was repeated except that variations were made in the flux composition. The results of these experiments are shown in Table 1. The firing temperature was 900° C.

These results show that an excellent combination of speed and afterglow is obtained using the process of the

EXAMPLE 8

A bismuth- and ytterbium-activated lanthanum oxychloride phosphor prepared in a manner similar to Example 5, but with 0.01 molar concentration Bi and 0.0012 molar concentration Yb in the starting material, was coated in an aliphatic polyurethane binder, Cargill ™ 832-41, at a 17/1 phosphor/binder ratio on clear poly(ethylene terephthalate) support. The coatings contained about 740 g of phosphor and binder/m². Two of these coatings were placed on each side of a double-coated, blue-sensitive silver bromoiodide X-ray film and exposed to 70 kV$_p$ X-rays which were filtered by ½ mm of copper and 1 mm of aluminum. The speed produced by these screens was about six times greater (+0.78 log E) than that produced by two medium-speed calcium tungstate intensifying screens (duPont Par Speed ™). The afterglow of the lanthanum oxychloride screens was satisfactory.

EXAMPLE 9

A sample of thulium-activated lanthanum oxyhalide was prepared in a manner similar to that of the bismuth-activated lanthanum oxychloride described in part B of Example 1.

About 24.8 g of the fine-grain thulium-activated lanthanum oxychloride produced in this manner was mixed with 7.9 g of dehydrated magnesium chloride prepared as in Preparation 1 and 2.7 g of lithium chloride. This mixture was then packed in an alumina crucible and covered with an alumina lid as described in Example 1. The crucible was placed in a tube furnace at 800° C. and fired in a nitrogen atmosphere for 1¼ hr. After firing, the contents of the crucible were removed, broken up and washed as described in Example 1. The speed of this phosphor was 32% less than that of a commercial calcium tungstate powder. The afterglow was 0.14.

EXAMPLE 10

A terbium-activated lanthanum oxychloride phosphor was prepared in a manner similar to that of the bismuth-activated lanthanum oxychloride described in part B of Example 1.

About 24.4 g of the fine-grain, terbium-activated lanthanum oxychloride phosphor produced in this manner were mixed with 15.7 g of dehydrated magnesium chloride prepared as in Preparation 1 and 4.9 g of potassium chloride. This mixture was packed in an alumina crucible and covered with an alumina lid, as described in Example 1. This crucible was placed in a tube furnace at 900° C. and fired for 1½ hr. After firing, the contents of the crucible were removed, broken up and washed as described in Example 1. The speed of the resulting phosphor was 32% less than that of a commercial calcium tungstate phosphor. Afterflow was 2.2. When tested with green-sensitive film, the speed was 11% less.

EXAMPLES 11–13

The procedure essentially the same as the procedure in Example 1 was repeated. About 24.8 g of the unrecrystallized bismuth- and ytterbium-activated lanthanum oxychloride LaOCl:Bi(0.01),Yb(0.0012) were mixed with various alkali halides, with and without magnesium chloride, and fired at 800° C. for 1¼ hr in a nitrogen atmosphere in covered alumina crucibles. The results of these experiments are shown in Table 2. The phosphors made without magnesium chloride in the mixture have much smaller grain size, lower speed and more afterglow than those made with the magnesium chloride. The small grain size of the phosphors made without the magnesium chloride increases the instability in moist atmospheres, makes the phosphors more difficult to coat and decreases speed in screen coatings because of light scattering.

by filtration on glass-fiber filter paper, redispersed in 200–300 mL of ethanol for 10–15 min, again collected, and air-dried. The afterglow of the phosphor was 0.16, while the speed was +0.58 log E in comparison with a lead-activated barium sulfate phosphor which had an afterglow of 0.01.

The phosphor made in this way was mixed with a solution of aliphatic polyurethane binder in 90 parts methylene chloride, 10 parts methanol (by weight), to produce a dispersion with 10 parts of phosphor and 1 part of binder by weight. The dispersion was coated on clear polyester support to produce a coating with a coverage of about 560 g of the phosphor/m². After overcoating with a thin layer of cellulose acetate, the speed of the coating was compared with that of a commercial $BaSO_4$:Pb screen. The comparison showed that, with excitation by X-rays from a tungsten target tube operated at 70 kV$_p$ and 10 mA with ½-mm copper and 1-mm aluminum in the beam, the LaOCl:Bi,Yb screen was about 3.5 times faster (+0.54 log E) than the Ba$SO_4$:Pb screen. A pair of these screens with the double-coated, blue-sensitive film used in Table 1 produced a speed which is about three times greater (+0.48 log E) than that produced by a pair of $BaSO_4$:Sr,Eu screens with the same film.

EXAMPLE 15

This example provides a comparison of a phosphor made by a method of the present invention with a phosphor made according to a method similar to that of the method disclosed by Mazza et al, *Gazzetta Chimica Italiana*, 70, 57–72 (1940). Rather than use simple lanthanum oxide as did Mazza et al, an activator-rare-earth

TABLE 2

| Example | Phosphor | Flux | Flux Ratio | Packing Density | Afterglow | Speed (Log E Difference) |
|---|---|---|---|---|---|---|
| Comparison E | BaSO$_4$:Pb | — | — | — | .03 | +.20 |
| Comparison F | LaOBr:Tb screen | — | — | — | 1.14 | reference |
| 11 | LaOCl:Bi,Yb | MgCl$_2$ . 2H$_2$O | 24.8:15.7 | 1.03 | .12 | +.59 |
| 12 | LaOCl:Bi,Yb | MgCl$_2$ . 2H$_2$O | 24.8:7.8 | 1.15 | .14 | +.58 |
| 13 | LaOCl:Bi,Yb | MgCl$_2$ . 2H$_2$O—LiCl | 24.8:7.8:2.7 | 1.16 | .00 | +.66 |
| Comparison G | LaOCl:Bi,Yb | LiCl | 24.8:—:8.3 | 1.47 | .78 | +.50 |
| Comparison H | LaOCl:Bi,Yb | LiCl | 24.8:—:2.8 | 1.55 | .95 | +.62 |
| Comparison I | LaOCl:Bi,Yb | NaCl | 24.8:—:11.4 | 1.7 | 1.16 | +.37 |
| Comparison J | LaOCl:Bi,Yb | KCl | 24.8:—:14.6 | 1.7 | 1.64 | +.28 |
| Comparison K | LaOCl:Bi,Yb | KCl | 24.8:—:4.9 | 1.6 | 1.50 | +.39 |

EXAMPLE 14

About 124 g of fine-grain LaOCl:Bi(0.01), Yb(0.0012), prepared by chlorination of the mixed oxides as described in Example 1, were placed in a bottle in a dry box under nitrogen atmosphere, along with about 22 g of substantially dehydrated magnesium chloride prepared as described in Preparation 2 and about 10 g of Reagent Grade lithium chloride. The mixture was tumbled for about 1 hr. then placed in a 250-mL alumina crucible, packed to a density between 0.8 and 1.0 g/cm³ by lightly tapping the crucible, then covered with an alumina lid.

The crucible was then placed in a quartz boat in the cool zone of the tube furnace, purged with 0.11 m³/hr of dry nitrogen for 15 min, heated to 800° C. for 1 hr with 0.11 m³/hr of dry nitrogen, then withdrawn to cool. The ingot was removed by inverting the crucible, then broken into smaller chunks to facilitate washing. These chunks were vigorously stirred in 1 liter of a 1:3 acetic acid:distilled water solution for 2–3 hr, collected oxide mixture was used so that an activated phosphor resulted. Further, while Mazza et al disclose the use of "anhydrous" magnesium chloride, this term has been used in the art to refer to magnesium chloride where only the easily removable water of hydration has been removed. Because Mazza et al disclose no procedure for the preparation of their "anhydrous" magnesium chloride, it is not possible to tell whether substantially dehydrated magnesium chloride was used, as that composition is defined in the detailed description, or only partially dehydrated magnesium chloride. For the purpose of the comparative example, substantially dehydrated magnesium chloride was used, and it would be expected that a phosphor made by this method using less than substantially dehydrated magnesium chloride would have poorer properties.

Preparation of a phosphor according to the method of Mazza et al

About 11 g of the substantially dehydrated magnesium chloride, prepared as described in Preparation 2, were placed in a 50 mL alumina crucible and melted in the quartz tube furnace at a temperature of 805° C. About 18 g of $La_2O_3$:Bi(0.02), prepared as described in Example 1, were then added by constant slow addition in about 3-5 min. The mixture was then heated at 805° C. in a dry nitrogen atmosphere for about 50 min.

Preparation of a phosphor according to the present invention

A sample of $La_2O_3$:Bi(0.02) was converted to LaOCl:Bi(0.01) by chlorination at 480° C. as described in Example 1.

About 36.8 g of this fine-grain LaOCl:Bi(0.01) were mixed with 6.3 g of substantially dehydrated magnesium chloride, prepared as described in Preparation 2, and 2.8 g of LiCl in a dry box as described before, then packed in a 100-mL crucible to a density of 0.78 g/cm$^3$. The crucible was covered with an alumina lid and fired in dry nitrogen in a quartz boat as described in Example 14 at 799° C. The sample was then removed, washed, collected and dried as described in Example 14.

The afterglow, speed and crystal size range of the LaOCl:Bi(0.01) phosphors were measured and the results are summarized in Table 3. The crystal size range was measured from a photomicrograph of a sample of the phosphor.

TABLE 3

| Sample Description | Afterglow | (Log E Difference) Relative Speed | Crystal Size Range |
|---|---|---|---|
| LaOCl:Bi(.01) (Mazza method) | 0.52 | +.38 | 10–55 |
| LaOCl:Bi (recrystalized according to the present invention) | 2.46 | +.65 | 6–30 |
| Commercial LaOBr:Tb screen | .36 | reference | |

EXAMPLE 16

Preparation of terbium-activated lanthanum oxybromide LaOBr:Tb(0.006)

$La_2O_3$:Tb(0.012) mixed oxide was prepared in a manner similar to that described in Example 1. It was then placed in a quartz boat and purged with nitrogen in a quartz tube furnace for about 15 min. The flow rate of nitrogen during purging was about 0.14 m$^3$/hr measured with a flowmeter calibrated for air. Then the sample was pushed into the furnace and heated to 480° C. The stream of nitrogen was passed through bromine at a temperature of 45° C. for about 2 hr and 45 min. Conversion of the mixed oxide to oxyhalide was complete as shown by the change in color. The size of the oxyhalide crystals was less than about 3 microns.

About 30.5 g of the fine-grain LaOBr:Tb(0.006) prepared in this way were mixed in nitrogen atmosphere with 8.4 g of anhydrous magnesium bromide and 4.8 g of LiBr.H$_2$O, then tumbled for about 1 hr and placed in 50-mL alumina crucibles which were then covered with alumina lids. The mixture was packed to a density of about 1.6 g/cm$^3$ and the crucibles were about 70% filled. The filled crucibles were placed in a quartz tube furnace, purged with dry nitrogen and fired at 810° C. for 1 hr. After firing, the samples were cooled in inert atmosphere, removed from the crucibles and broken up. The mixture was then washed with 1:3 acetic acid:ethanol at 40°-50° C. for about 2 hr, collected by filtration on glass-fiber paper, redispersed in 200-300 ml of ethanol for 10-15 min, again collected, and dried in air.

The afterglow and speed of the LaOBr:Tb(0.006) phosphor made in this way were measured and the results are summarized in Table 4.

EXAMPLE 17

The procedure of Example 16 was repeated, except that the crucibles were packed to a density of about 1.2 g/cm$^3$ and the LiBr.H$_2$O was omitted from the flux mixture. The afterglow and speed of the LaOBr:Tb(0.006) phosphor made in this way are shown in Table 4.

EXAMPLE 18

The procedure of Example 16 was repeated with 4 g of LiBr instead of 4.8 g of LiBr.H$_2$O and the crucibles were packed to a density of about 1.6 g/cm$^3$. The afterglow and speed of the LaOBr:Tb(0.006) phosphor made in this way are shown in Table 4.

EXAMPLE 19

About 30.5 g of fine-grain LaOBr:Tb, prepared as described in Example 16, were mixed with 12 g of anhydrous MgBr$_2$ and 6.7 g NaBr in nitrogen atmosphere, then tumbled for about 1 hr and packed to a density of about 1.9 g/cm$^3$ in 50-mL alumina crucibles which were then covered with alumina lids. The filled crucibles were placed in a quartz tube furnace, purged with nitrogen and fired at 924° C. for about 1 hr. After firing, the samples were cooled in inert atmosphere, removed from the crucibles and broken up. The mixture was then washed with 1:1.5:1.5 acetic acid:water:ethanol (by volume) for 2 hr at 40°-50° C., collected by filtration on glass-fiber paper, redispersed in 200-300 mL of ethanol for 10-15 min, again collected, and dried in air.

The afterglow and speed of the LaOBr:Tb(0.006) phosphor made in this way are shown in Table 4.

TABLE 4

| Sample Description | Afterglow | Relative Speed (Log E Difference) |
|---|---|---|
| Ex 16, LaOBr:Tb | 2.21 | +.35 |
| Ex 17, LaOBr:Tb | 2.61 | +.18 |
| Ex 18, LaOBr:Tb | 2.46 | +.31 |
| Ex 19, LaOBr:Tb | 2.87 | +.40 |
| Commercial LaOBr:Tb screen | 1.53 | reference |

The data show that LaOBr:Tb phosphor with acceptable speed can be made by the method described herein. The afterglow can be controlled by methods known in the art.

The invention has been described in detail with particular reference to preferred embodiments thereof, but it will be understood that variations and modifications are within the spirit and scope of the invention.

We claim:

1. A method for recrystallizing an activated rare-earth oxyhalide phosphor comprising the steps of
    (1) forming a substantially homogeneous mixture comprising said rare-earth oxyhalide phosphor and a flux and
    (2) firing said mixture in an inert atmosphere at a temperature above the melting point of said flux wherein said flux comprises substantially dehydrated magnesium halide having a water content between about 0 and 3 moles of water/mole of magnesium halide and wherein the halide of said oxyhalide and said magnesium halide is bromide or chloride.

2. The method of claim 1 wherein said flux further comprises an alkali metal halide wherein the molar ratio of said activated rare-earth oxyhalide:dehydrated magnesium halide:alkali metal halide is within the range 1.00:0.20–1.00:0.20–0.75.

3. The method of claim 2 wherein said molar ratio is 1.00:0.35:0.35.

4. The method of claim 1 wherein said firing is carried out in a confined chamber.

5. The method of claim 1 wherein said rare-earth oxyhalide phosphor to be recrystallized is prepared by reacting an activator-rear-earth mixed oxide or oxide mixture with gaseous halogen.

6. The method of claim 1 wherein said magnesium halide is magnesium chloride.

7. The method of claim 1 wherein the magnesium halide is magnesium chloride and said water content is less than about 2 moles of water/mole of magnesium chloride.

8. The method of claim 1 wherein said oxyhalide is bismuth-activated lanthanum oxychloride wherein the bismuth content is between about 0.3 and 3.0 molar percent based on the lanthanum present.

9. The method of claim 8 wherein said oxyhalide is bismuth- and ytterbium-activated lanthanum oxychloride, wherein the ytterbium content is between about 0.005 and 0.5 molar percent based on the lanthanum present.

10. A method for forming high-speed crystals of bismuth-activated lanthanum oxychloride phosphor comprising the steps of:

(a) forming crystals of bismuth-activated lanthanum oxychloride phosphor by reacting a bismuth-lanthanum mixed oxide or oxide mixture with gaseous chlorine;

(b) mixing the bixmuth-activated lanthanum oxychloride crystals formed in step (a) with a flux comprising substantially dehydrated magnesium chloride wherein the water content is between about 0 and 3 moles of water/mole of magnesium chloride and lithium chloride wherein the molar ratio of bismuth-activated lanthanum oxychloride:dehydrated magnesium chloride-lithium chloride is within the range 1.00:0.20–1.00:0.20–0.75;

(c) compressing the mixture formed in step (b) to a density greater than about 0.8 g/cm$^3$;

(d) firing the compressed mixture formed in step (c) in a confined chamber and in an inert atmosphere at about 800° C. for a time sufficient to recrystallize said bismuth-activated lanthanum oxychloride; and (e) washing the recrystallized bismuth-activated lanthanum oxychloride formed in step (d) with an acidic solution to remove said flux.

11. The method of claim 10 wherein said ratio is 1.00:0.35:0.35.

12. The method of claim 10 wherein said water content is less than about 2 moles of water/mole of magnesium chloride.

13. The method of claim 10 wherein the bismuth content of said bismuth-activated lanthanum oxychloride is between about 0.3 and 3.0 molar percent based on the lanthanum present.

14. The method of claim 13 wherein said oxyhalide further comprises ytterbium wherein the ytterbium content is between about 0.005 and 0.5 mole percent based on the lanthanum present.

* * * * *